United States Patent [19]

Woodrow

[11] Patent Number: 4,910,987
[45] Date of Patent: Mar. 27, 1990

[54] ROLL NECK FACE SEAL FOR CANTILEVERED ROLLING MILL

[75] Inventor: Harold E. Woodrow, Northboro, Mass.

[73] Assignee: Morgan Construction Company, Worcester, Mass.

[21] Appl. No.: 316,488

[22] Filed: Feb. 27, 1989

[51] Int. Cl.[4] .............................................. B21B 31/00
[52] U.S. Cl. .................................. 72/237; 241/101.2; 277/12; 277/95; 277/152
[58] Field of Search ...................... 241/101.2, 227, 235; 72/236, 237; 277/70, 14 R, 71, 101, 212 C, 212 F, 228, DIG. 7, 95, 205, 206 R, 12, 152, 165

[56] References Cited

U.S. PATENT DOCUMENTS

| | | | |
|---|---|---|---|
| 4,022,480 | 5/1977 | Salter | 277/95 |
| 4,234,196 | 11/1980 | Iida | 277/92 X |
| 4,586,720 | 5/1986 | Simmons et al. | 277/152 |

FOREIGN PATENT DOCUMENTS

.12130  4/1986  Japan ...................................... 72/237

Primary Examiner—Mark Rosenbaum
Attorney, Agent, or Firm—Samuels, Gauthier, Stevens & Kehoe

[57] ABSTRACT

In a rolling mill, for use in combination with a rotatable shaft protruding from a housing, with a work roll mounted on the shaft for rotation therewith exteriorly of the housing, a seal assembly is disclosed for establishing a seal between the shaft and the housing. The seal assembly comprises a circular flinger mounted on the shaft for rotation therewith at a location interposed axially between the work roll and the housing. The flinger has an annular contact surface extending radially from the roll shaft and facing toward the housing. A seal end plate is fixed to the housing and carries a seal holder which has a circular groove facing toward the contact surface. A resilient seal has a circular base received in the circular groove and a pair of flanges extending from the seal holder to terminate at radially spaced edges in sealing contact with the contact surface along inner and outer radially spaced circular lines.

8 Claims, 4 Drawing Sheets

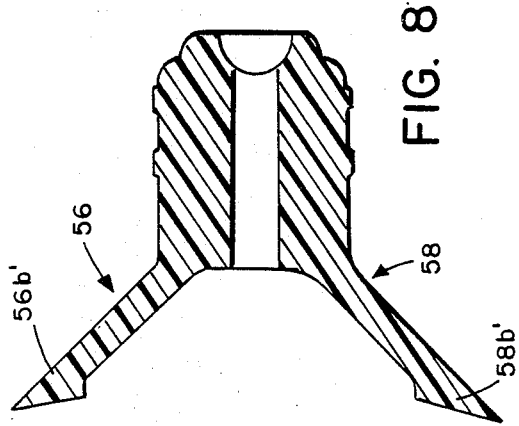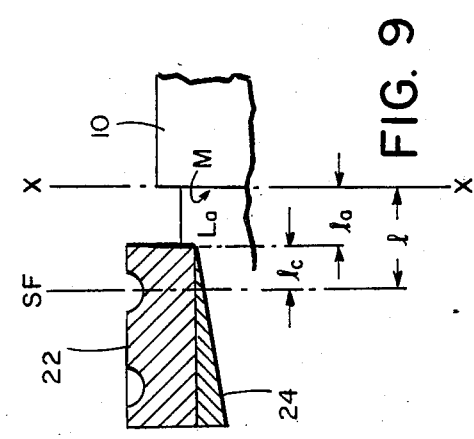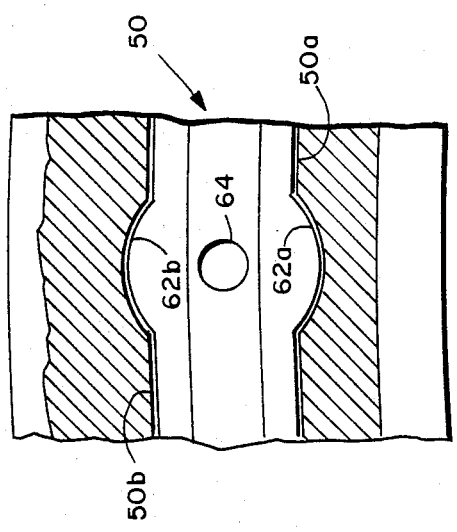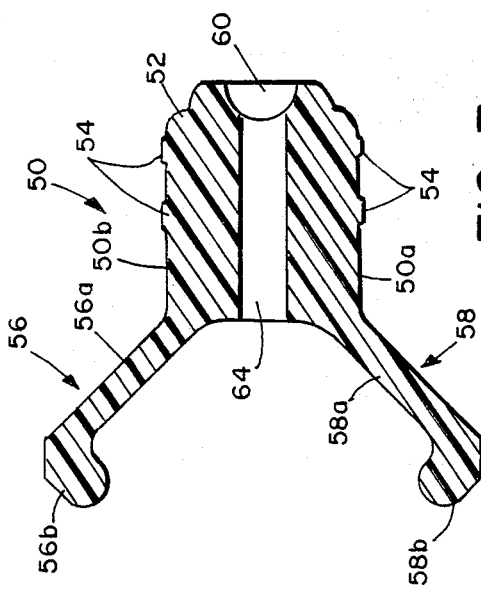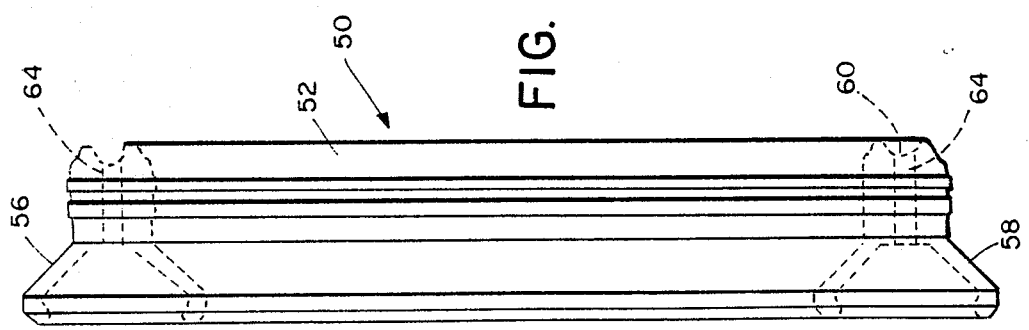

ROLL NECK FACE SEAL FOR CANTILEVERED ROLLING MILL

BACKGROUND OF THE INVENTION

1. Field of the Invention

This invention relates generally to so called "cantilevered" rolling mills, where the work rolls are mounted in an overhung fashion on the ends of roll shafts which protrude from housings containing the shaft bearings, gears, roll parting adjustment mechanisms, etc. The invention is concerned in particular with an improved dual lip shaft seal assembly for preventing leakage of lubricants from such housings and for preventing ingress of external contaminants, e.g., cooling water and entrained dirt, mill scale, etc.

2. Description of the Prior Art

FIGS. 1 and 2 are illustrative of a typical prior art mill and shaft seal arrangement.

Roll shafts 10 are journalled between sleeve bearings 12 supported in rotatable eccentrics 14a, 14b. The eccentrics in turn are journalled respectively for rotation in the front and rear plates 16a, 16b of a housing 18. The roll shafts 10 carry gears 20 which mesh with other gears (not shown) forming part of the mill drive.

The roll shafts have ends protruding externally through the front housing plate 16a. These protruding ends include truncated conical portions 10, on which grooved work rolls 22 are removably secured by means of tapered sleeves 24 axially wedged therebetween. Transversely extending keys 26 bear against the outboard flanks of the rolls and are held in place by set screws 28 threaded into the ends of the roll shafts. Covers 30 enclose the keys 26 and the outboard ends of the sleeves 24. The covers are held in place by caps 32 threaded onto the shaft ends. Simultaneous rotation of each roll shaft's eccentrics 14a, 14b in opposite directions serves to symmetrically adjust the roll shafts and the work rolls carried thereon with respect to the mill pass line.

During operation of the mill, lubricant is applied to the shaft bearings and the eccentrics from within the housing, and cooling water is applied to the work rolls exteriorly of the roll housing. Dual lip seal shaft assemblies 34 serve to retain the lubricant within the housing while at the same time excluding cooling water and entrained mill scale, dirt, etc. from penetrating into the housing interior. As can be best seen in FIG. 2, each seal assembly 34 includes a pair of metal flingers 36, 38 surrounding the roll shaft and interposed between the inboard flank of the work roll 22 and the respective adjacent shaft bearing 12 and eccentric 14a. The flingers have generally L-shaped cross-sectional configurations, with abutting base portions 36a, 38a and with radially extending axially spaced flanges 36b, 38b defining confronting annular contact surfaces 36c, 38c. The flinger base portions are supported on a cylindrical land $L_a$ machined into the shaft surface at a location between the larger diameter portion journalled for rotation in the adjacent bearing 12 and the truncated conical portion 10' on which the work roll 22 is removably mounted by the tapered sleeve 24 interposed therebetween. Land $L_a$ has an axial length $l_a$. A seal end plate 40 is fastened to the housing end plate 16a. The seal end plate has a pair of openings 42 through which the roll shafts protrude.

The openings 42 are concentric with the rotational axes of the eccentric bearing sleeves 14a. Seal holders 44 are journalled for rotation in the openings 42, and are mechanically tied to the eccentric sleeves 14a for rotation therewith by means of machine screws 46 or the like. The seal holders have inwardly extending radial flanges 44' surrounding the roll shafts. The inner rims of the flanges 44' are grooved as at 44" to receive circular radially outwardly protruding beads on the base portions of seals 48 having dual oppositely facing axially separated lips 48a, 48b. The inner edges of the flanges 44' and the seals 48 mounted thereon are arranged coaxially with the rotational axes of the roll shafts.

The flingers 36, 38 rotate with the roll shafts, and the seals 48 remain fixed in relation to their respective seal holders 44, the latter being tied to the eccentric sleeves 14a which only are rotated to achieve adjustment of the roll parting. Contact between the outboard seal lip 48a and contact surface 36c serves to exclude cooling water and entrained particulates from the housing interior, whereas contact between the inboard seal lip 48b and contact surface 38c serves to retain lubricants within the housing.

The major drawback with this arrangement stems from the need to extend the length $l_a$ of the land $L_a$ in order to accommodate the axially spaced seal lips 48a, 48b acting on the confronting contact surfaces 36c, 38c of the two flingers 36, 38. More particularly, and with reference to FIG. 9, it is commonly accepted that in cases of the type herein under consideration, where shafts are subjected to combined reverse bending and steady torsion, the bending moment "M" at plane "X—X" is equal to SF l, where "SF" is the separating force resulting from rolling and "l" is the sum of "$l_a$" and "$l_c$". For a given bending moment design limit, SF is inversely proportional to l. Since $l_c$ is a minimum dimension dictated primarily by the strength of the roll material, in order to increase the rolling capacity of the mill, it becomes essential to shorten $l_a$ as much as possible.

SUMMARY OF THE PRESENT INVENTION

The present invention retains the dual lip sealing capability of the prior art arrangement. Here, however, the seal lips are reoriented into a radially spaced arrangement in sealing contact with a common annular contact surface on a single flinger. The single flinger occupies a substantially shorter cylindrical land on the roll shaft, thereby markedly reducing stresses experienced as the roll shafts undergo separating forces durring rolling. This in turn translates into an ability to roll under much higher loads.

Other objects and advantages of the present invention will become more apparent as the description proceeds with the aid of the accompanying drawings, wherein:

BRIEF DESCRIPTION OF THE DRAWINGS

FIG. 5 is a side elevational view of a flexible seal of the type illustrated in FIGS. 3 and 4;

FIG. 6 is a sectional view taken along line 6—6 of FIG. 4;

FIG. 7 is a cross-sectional view on an enlarged scale taken through the flexible seal of FIGS. 3-6;

FIG. 8 is a view similar to FIG. 7 shown an alternate embodiment of the flexible seal; and FIG. 9 is a diagrammatic illustration of separating forces and resulting bending moments experienced by the roll shaft during rolling.

DETAILED DESCRIPTION OF THE INVENTION

Figure 1:
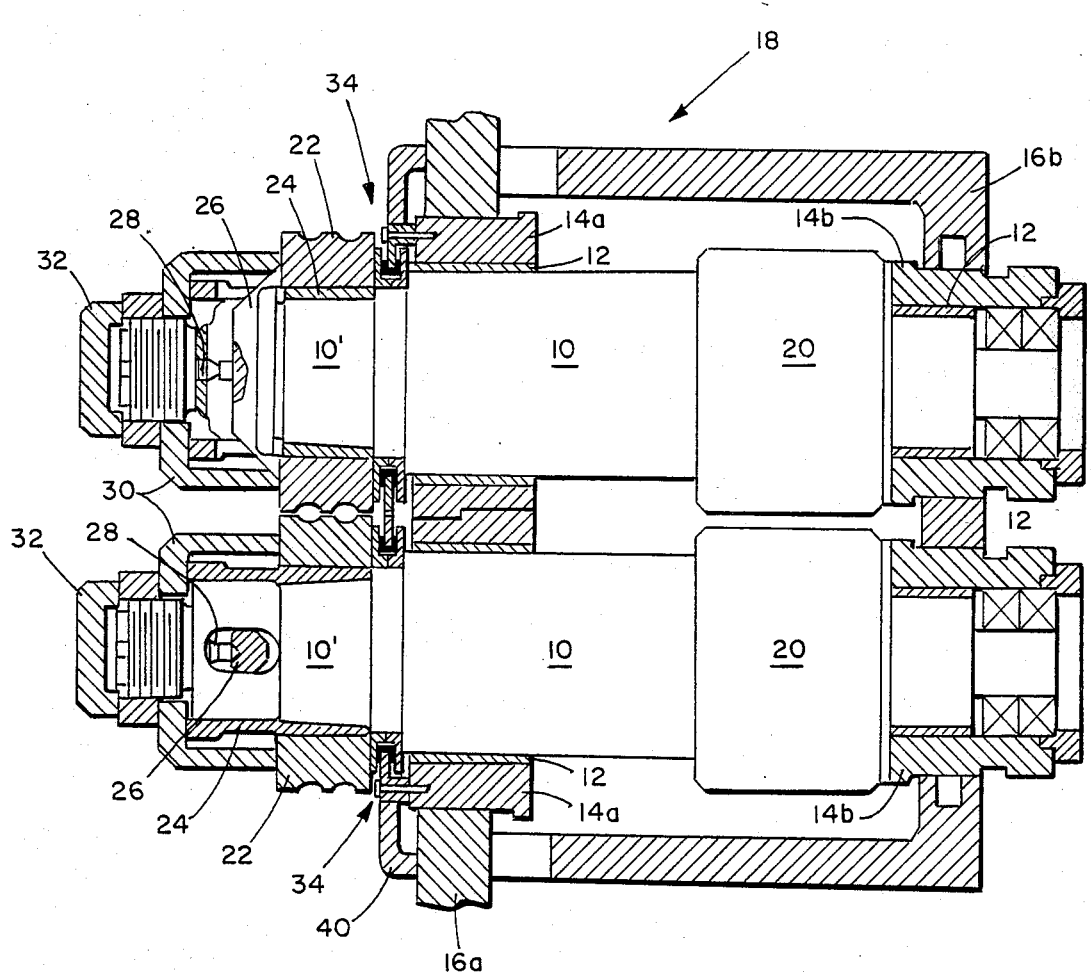
FIG. 1 is a cross-sectional view through a typical cantilevered rolling mill with prior art seals employed on the roll shafts.
Figure 3:
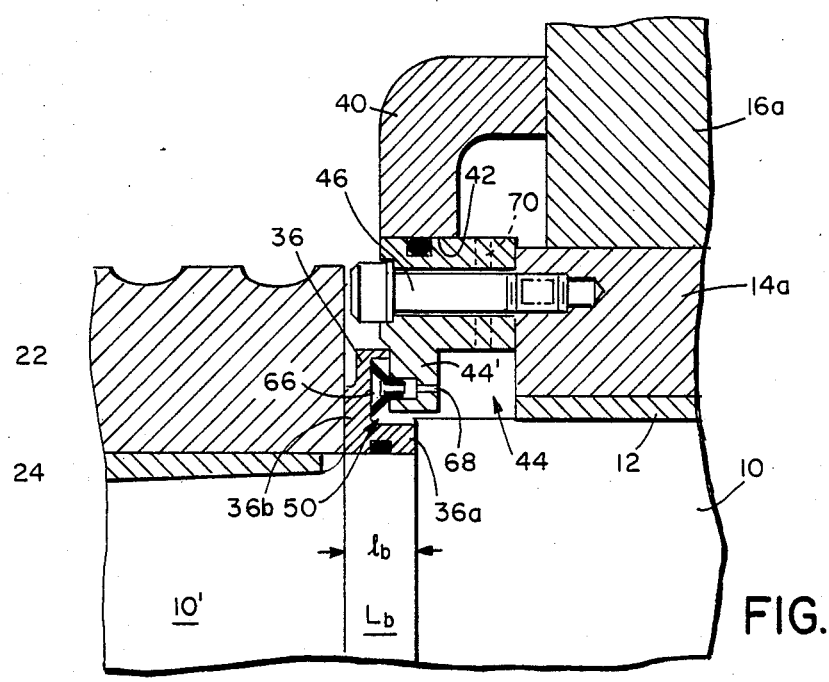
FIG. 3 is a view similar to FIG. 2 showing the seal arrangement of the present invention.
Figure 2:
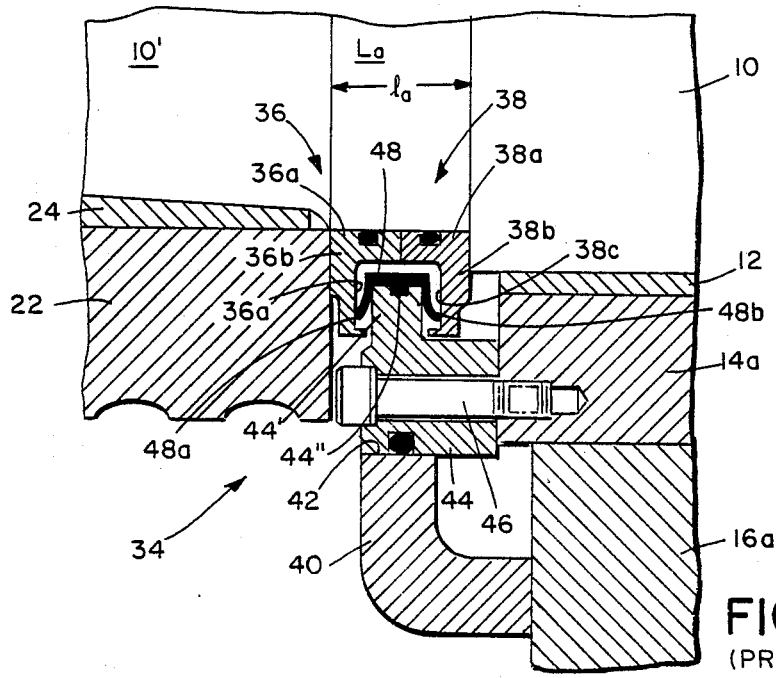
FIG. 2 is an enlarged partial sectional view of a portion of the arrangement shown in FIG. 1, and illustrating the prior art seal in greater detail.
Figure 4:
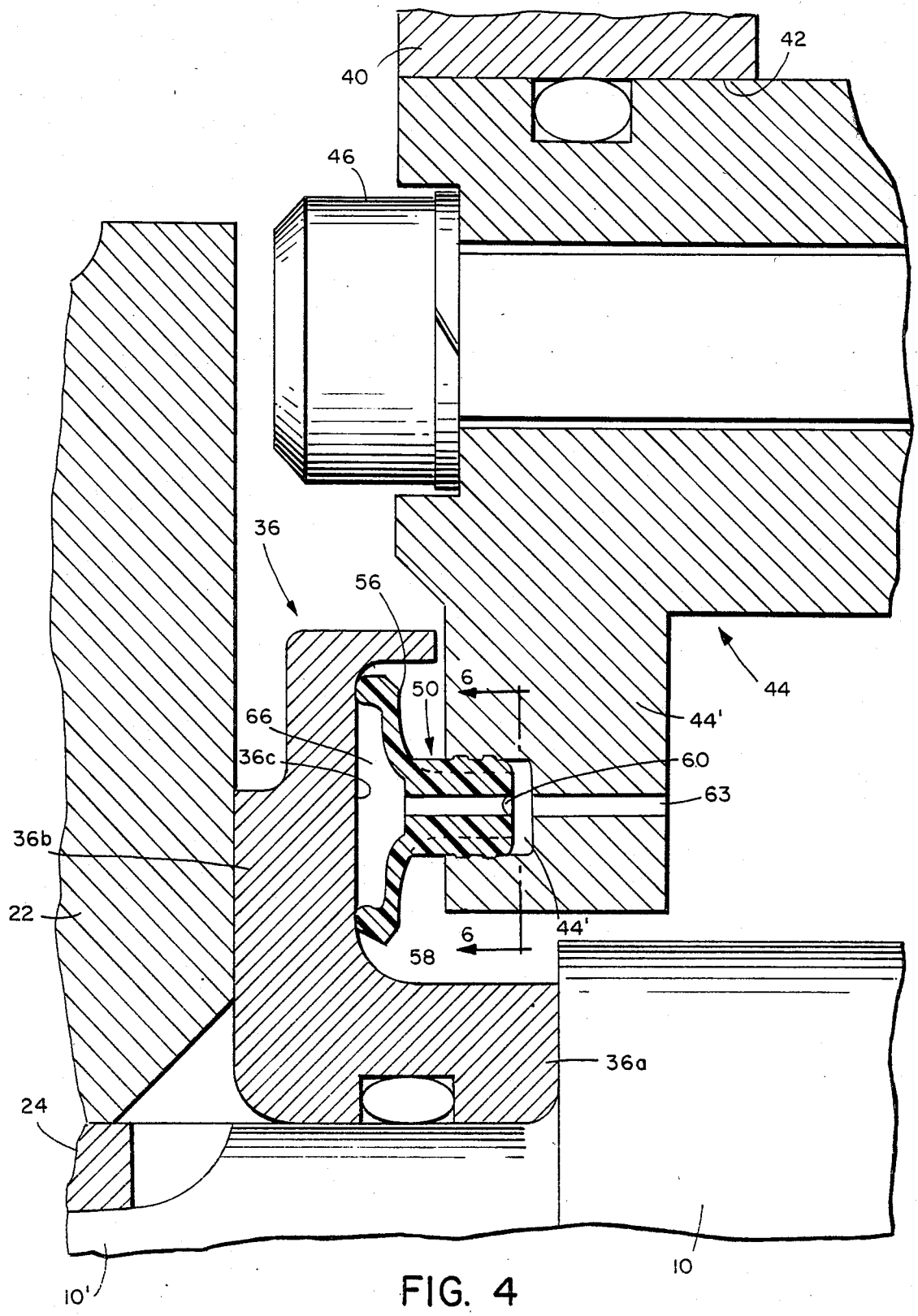
FIG. 4 is a greatly enlarged view of a portion of FIG. 3.

Referring now to FIGS. 3 and 4 wherein the same reference numerals have been employed to designate components which are common to the prior art arrangement shown in FIGS. 1 and 2, it will be seen that the present invention employs a single flinger 36 which is again provided with an L-shaped configuration having a cylindrical base portion 36a and a radial flange portion 36b defining an annular contact surface 36c facing in the direction of the housing. The base portion 36a is seated on a cylindrical shaft 1 and $L_b$ having an axial length $l_b$.

The seal holder 44 is mounted for rotation within the seal end plate 40, is tied to the eccentric sleeve 14a by means of a connecting screw or pin 46, and is provided with an inwardly extending radial flange 44'. Here, however, the groove 44" has been shifted to a position facing the contact face 36c to accommodate introduction of a totally redesigned flexible seal 50.

With reference additionally to FIGS. 5-7, it will be seen that seal 50 includes a circular base 52 with inner and outer cylindrical surfaces 50a, 50b interrupted by circular ribs 54, and with a circular groove 56 at one end thereof. A pair of lips 58, 60 extend from the opposite end of the base 52. Lip 56 comprises a truncated conical web 56a extending angularly outwardly to a rounded edge 56b, and lip 58 likewise comprises a truncated conical web 58a extending angularly inwardly to a rounded edge 58b.

The circular base 52 is provided at 180° intervals with thickened portions, one of which is illustrated in FIG. 6. The thickened portions are defined by bosses 62a, 62b respectively protruding radially inwardly and outwardly from cylindrical surfaces 50a, 50b. A passageway 64 extends through each thickened portion of the base. The base 52 is configured and dimensioned to be received in the groove 44" of the seal holder, with its lips 56b, 58b spread apart (compare FIGS. 4 and 7) into sealing contact with the contact surface 36c of the flinger 36. Sealing contact thus occurs along inner and outer radially spaced circular lines. The bosses 62a, 62b respectively extend across the contact interfaces of surfaces 50a, 50b with the adjacent interior surfaces of the groove 44" into recesses in those interior groove surfaces to provide an interlock which effectively prevents rotation of the seal relative to the seal holder.

The lips 56, 58 cooperate with the annular contact surface 36c in defining an annular chamber 66 surrounding the roll shaft. The passageways 64 in the seal base communicate with passageways 68, 70 in the seal holder to vent the chamber 66, thus preventing pressure or vacuum conditions to build up as a result of temperature fluctuations during rolling. A pressure condition in chamber 66 might tend to lift the lips 56, 58 off the contact surface 36c and thus jeopardize sealing integrity. On the other hand, a vacuum build up might tend to pull the lips harder against the same surface, thereby increasing friction and wear.

With reference to FIG. 3, it will be seen that the use of a single flinger 36 in combination with a redesigned and reoriented seal 50 results in a significant reduction in the axial length $l_b$ of shaft land $L_b$ as compared with the length $l_a$ of shaft L and $L_a$ in the prior art arrangement.

A further advantage of the present invention is that when the work roll 22 and flinger 35 are removed from the shaft, both seal lips 56, 58 are fully and equally visible for examination by maintenance personnel.

FIG. 8 illustrates an alternate embodiment of the seal which is identical to that shown in FIG. 7, except that here the edges 56b', 58b' of the lips 56, 58 are sharpened rathe than rounded. It is believed that this modification may prove to be advantageous in eliminating or at least minimizing the entrapment and build up of fluids between the seal lips and the flinger contact surface.

I claim:

1. In a rolling mill, for use in combination with a rotatable shaft protruding from a housing, with a work roll mounted on the shaft for rotation therewith exteriorly of the housing, a seal assembly for establishing a seal between the shaft and the housing, said seal assembly comprising:

a circular flinger mounted on the shaft for rotation therewith at a location interposed axially between the work roll and the housing, said flinger having an annular contact surface extending radially from the roll shaft and facing toward the housing;

a seal end plate fixed to the housing;

a seal holder carried by the seal end plate, said seal holder having a circular groove facing toward said contact surface; and a resilient seal having a circular base received in said groove and having a pair of flanges extending from said seal holder to terminate at radially spaced edges in sealing contact with said contact surface along inner and outer radially spaced circular lines.

2. The seal assembly as claimed in claim 1 wherein said flanges cooperate with said contact surface to enclose an annular chamber surrounding the roll shaft, and means for venting said chamber.

3. The seal assembly as claimed in claim 2 wherein said means for venting comprises a communicating network of passageways in said circular base and said seal holder.

4. The seal assembly of claim 1 wherein said circular groove has interior cylindrical surfaces in contact with exterior cylindrical surfaces on said base; and interlocking means extending radially across the interfaces of said interior and exterior surfaces for preventing rotation of said seal in relation to said seal holder.

5. The seal assembly of claim 4 wherein said interlocking means comprises bosses on the exterior cylindrical surfaces of said base extending radially into recesses in the interior cylindrical surfaces of said groove.

6. The seal assembly of claim 1 wherein said flanges are configured and dimensioned to be radially spread apart as a result of their edges being placed in sealing contact with said contact surface.

7. The seal assembly of claim 3 wherein said base is provided with at least one radially thickened segment defined by bosses protruding radially into recesses in the interior surfaces of said groove, and wherein said network of passageways includes a passageway extending through said thickened segment.

8. In a rolling mill, for use in combination with a rotatable shaft having one end protruding from a housing, wi a work roll mounted on the protruding shaft end for rotation therewith, a seal assembly for establishing a seal between the shaft and the housing, said seal assembly comprising:

a circular first sealing element mounted on the protruding shaft end for rotation therewith at a location interposed axially between the work roll and the housing, said first sealing element having an annular contact surface extending radially from the roll shaft and facing toward the housing;

a seal end plate fixed to the housing;

a second sealing element carried by the seal end plate, a circular groove in said second sealing element surrounding the roll shaft and facing towards said contact surface; and a resilient seal having a circular base received in said groove and having a pair of lips extending from said base and away from said seal holder to terminate at radially spaced edges in sealing contact with said contact surface along inner and outer radially spaced circular lines.

* * * * *